Oct. 23, 1962
F. PETZOLDT
3,059,482
CONTROL ASSEMBLIES FOR FEED CARRIAGES
IN MACHINE TOOLS AND THE LIKE
Filed Oct. 29, 1959
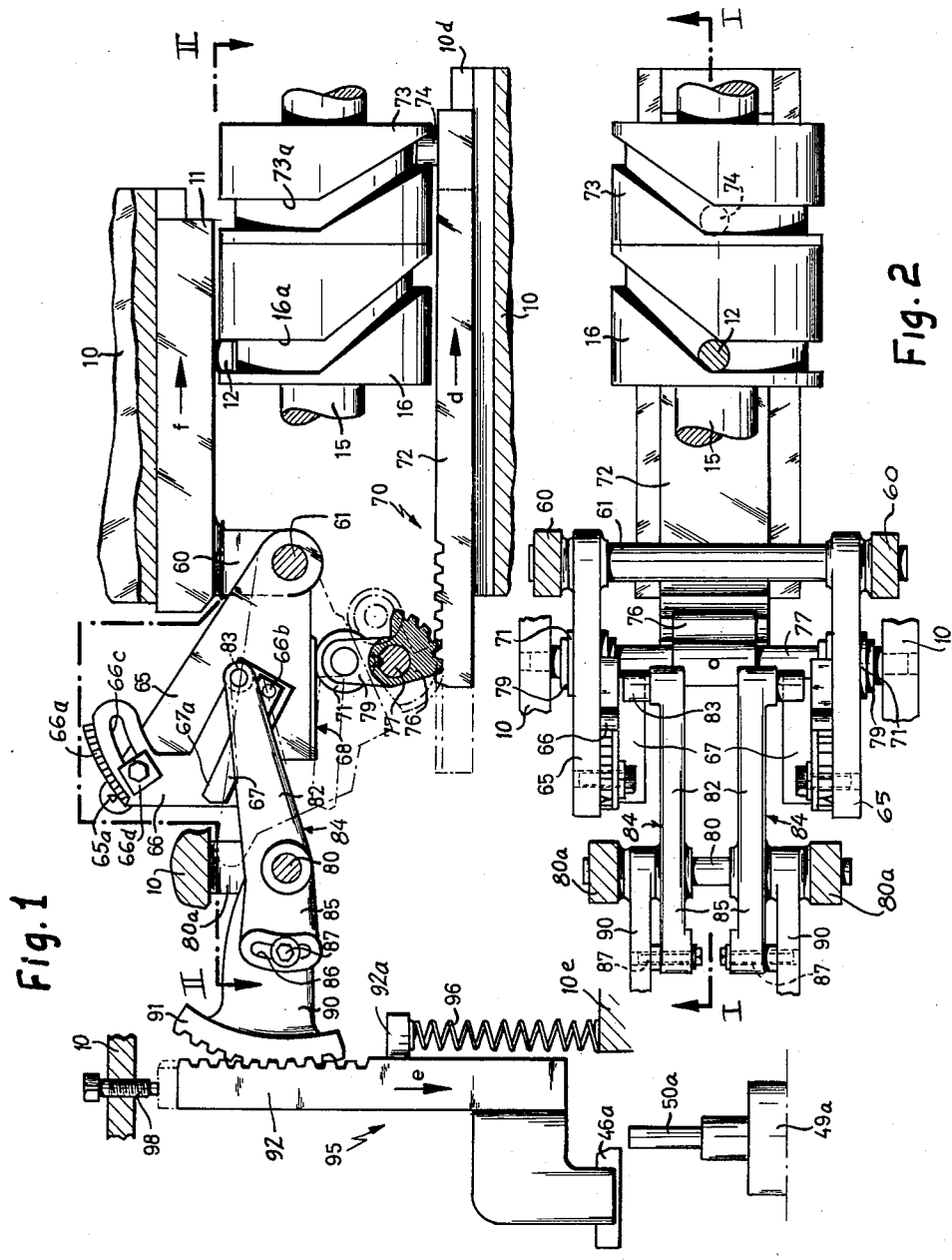
INVENTOR
FRITZ PETZOLDT
BY Michael S. Striker
ATTORNEY United States Patent Office 3,059,482
Patented Oct. 23, 1962

3,059,482
CONTROL ASSEMBLIES FOR FEED CARRIAGES
IN MACHINE TOOLS AND THE LIKE
Fritz Petzoldt, Pappelweg 5, Leinfelden,
Wurttemberg, Germany
Filed Oct. 29, 1959, Ser. No. 849,587
Claims priority, application Germany Oct. 30, 1958
7 Claims. (Cl. 74—53)

The present invention relates to machine tools in general, and more particularly to improvements in means for controlling the movements of one, two, or more tool-supporting feed carriages in such machines, preferably for semi- or fully-automatic single- and multi-spindle machine tools.

As is known, it is necessary in the operation of many machine tools to move the tool into a first position with respect to the work, and to thereupon move the tool during the actual operation performed upon the work. The movement of the tool from a position distant from the work into the operative position, normally immediately adjacent to the latter, usually occurs more rapidly than the movement of the tool during actual work. In the machine tools of presently utilized construction, such two-step advance of tools is often brought about by an arcuate cam which is mounted in such a way as to advance the feed carriage and is formed with two different cam surfaces. One cam surface serves as a means for rapidly advancing the feed carriage and a tool mounted thereon toward the work piece, and the other cam surface thereupon advances the carriage during the actual contact or engagement of the tool with the work piece. If it is desired to change one or both travelling distances through which the feed carriage is advanced, the cam must be replaced by one with correspondingly altered cam surface or surfaces, this resulting in increased production costs as the machine tool requires a number of comparatively complicated spare cams in order to be capable of operation under many different operating conditions.

It is also known to utilize machine tools in which the distance covered by the feed carriage toward and away from the work remains unchanged but the speed at which and the stroke or distance through which the carriage advances may be varied by a pair of different cams and a system of levers for alternately connecting the one or the other cam with the feed carriage. The disadvantage of such constructions is that the ratio between the rapid and slow movements of the carriage toward, and during the contact of a tool with the work, remains unchanged, i.e. that the stroke through which the carriage advances toward the work cannot be varied with respect to the stroke through which the carriage advances a tool during actual contact with the work.

An important object of the present invention is to provide a control system for feed carriages in machine tools which is so constructed that the stroke through which the feed carriage moves toward the work may be varied with respect to the stroke through which the carriage advances a tool during actual contact with the work.

Another important object of the invention is to provide a control system of the above outlined characteristics which is capable of simultaneously controlling the stroke of two or more feed carriages and of the tools connected thereto; which utilizes a single drive even if it controls two or more feed carriages; and which may be readily adapted for use in many machine tools of presently known design without requiring complicated and costly alterations in such machines.

A further object of the instant invention is to provide a control system for the feed carriages in machine tools which is of very simple design; which utilizes comparatively simple and inexpensive cams; which is capable of infinitely varying the strokes through which the carriage or carriages move a tool toward and during actual contact with the work; and in which the changes in the aforementioned strokes may be brought about without any distortion.

With the above objects in view, the invention resides in the provision of a control assembly for one or more feed carriages of semi- or fully-automatic machine tools and the like, which comprises a single control carriage, drive means for moving the control carriage in a straight path, cam means including at least one preferably linear cam pivotally connected to and movable with the carriage, and means operatively connected with each feed carriage and including follower means which scans the cam means for transforming pivotal movements of the cam and/or linear movements of the control carriage into requisite movements of the respective feed carriage, the latter supporting a tool which is then moved toward and into contact with a work piece. The use of a control carriage which moves in a straight path brings about the important advantage that the heretofore utilized arcuate cams may be replaced by much simpler and hence cheaper linear cams, i.e. by cams with straight cam faces. By providing rocking means for varying the inclination of one or more linear cams with respect to the direction in which the control carriage advances, the stroke of each feed carriage and of the tool connected thereto may be varied infinitely without any distortions in the rate of speed at which the feed carriage or carriages advance.

The control carriage may be moved directly by a drive shaft; through a system of cams, preferably of the cylindrical type; or by a crank drive. It is advisable to provide a drive of a type which need not be exchanged if the machine tool is utilized in connection with different tools and different work pieces, i.e. the drive should be capable of moving the control carriage at variable rates of speed and preferably also through distances of variable length.

The means for transmitting motion of the cam means to the feed carriage or carriages may comprise any suitable lever system. It has been found that it is often advantageous to utilize a bell crank or two-armed lever for each feed carriage and to swing each bell crank during the initial portion of its stroke either by means of a quick approach cam or by means of a rocking or swinging assembly which is directly or indirectly controlled and operated by the drive means for the control carriage. The rocking assembly may comprise a reciprocable toothed rack which meshes with a toothed segment to cause swinging movements of a follower, and the latter then transmits a corresponding movement to each bell crank whereby to move the respective feed carriage or carriages and the tool or tools toward the work. The bell crank or cranks need not be directly coupled with the respective feed carriages but may be angularly adjustably connected to suitable lever means each of which comprises a toothed segment meshing with a second toothed rack forming part of, or connected to, the respective feed carriage. By adjusting the position of the lever means with respect to the associated bell crank, the idle stroke through which the feed carriage or carriages will move the tool or tools toward the work may be varied in a very convenient manner. Each bell crank and the associated lever means is pivotally mounted on a common shaft. If desired, the position of a bell crank and of the associated lever means may be reversed, i.e., the bell crank then carries a toothed segment meshing with a toothed rack of the respective feed carriage, and the lever means carries a follower which is swingable first by the aforementioned rocking assembly and thereupon by the linear cam or cams carried by the control carriage.

The novel features which are considered as characteristic of the invention are set forth in particular in the appended claims. The invention itself, however, both as to its construction and its method of operation, together with additional objects and advantages thereof, will be best understood from the following description of a specific embodiment when read in connection with the accompanying drawings, in which:

FIG. 1 illustrates an arrangement for advancing the feed carriages and tools in a machine tool, the view of FIG. 1 being a section taken along the line I—I of FIG. 2, as seen in the direction of arrows; and FIG. 2 is a section taken along the line II—II of FIG. 1, as seen in the direction of arrows.

Referring now in greater detail to the drawings, there is shown an arrangement which is capable of advancing one, two or even more tool supporting means or feed carriages. This arrangement comprises a single control carriage 11 which is reciprocable in a linear path defined by the straight ways 10a of a machine frame or bed 10 and carries a pair of brackets 60 for a shaft 61, the latter pivotally supporting two or more arms 65. Each of the arms 65 supports an angularly adjustable cam holder 66 and also carries a pointer or indicator 65a which cooperates with a graduated scale 66a formed on the respective cam holder 66. The cam holders pivot about bolts 66b carried by the respective arms 65 and are formed with arcuate slots 66c for the passage of releasable fastening means here shown as set screws 66d which latter permit angular adjustments of the cam holders about their bolts 66b. Each cam holder 66 carries a straight cam 67 formed with a linear cam surface 67a tracked by a follower roller 83 which latter is rotatably mounted at the free end of an arm 82 forming part of a motion transmitting bell crank 84. As is shown in FIG. 2, the arrangement comprises two bell cranks 84, both pivotally mounted on a common shaft 80 carried by brackets 80a fixed to or integral with the machine frame 10. The shaft 80 also supports a pair of swingable one-armed levers 90 each of which is formed with a toothed segment 91. The angular position of each lever 90 with respect to the adjacent bell crank 84 may be adjusted by releasing a set screw 87 which passes through an arcuate slot 86 formed in the second arm 85 of the respective bell crank 84 and is fixed to the lever 90.

At its underside, each pivotable arm 65 is formed with a plane cam surface 68 which guides one of two roller followers 71. The followers 71 are mounted on arms 79 carried by and rigidly fixed to a single transverse shaft 77 which is rotatable in the machine frame 10. Intermediate the arms 79, the shaft 77 rigidly supports a toothed segment 76 whose teeth mesh with the teeth of a rack 72 forming part of a swinging or rocking assembly 70 and mounted for reciprocating movements in the ways 10d of the machine frame 10. The rocking assembly 70 also includes the aforementioned followers 71, the arms 79, the shaft 77 and the toothed segment 76. The toothed rack 72 of the assembly 70 carries a follower roller or pin 74 which extends into the suitably shaped groove 73a of a second cylindrical cam 73, the latter being coaxially fixed to and rotatable by a drive shaft 15 together with a cylindrical cam 16 whose cam groove 16a guides a follower roller or pin 12 of the control carriage 11.

The bell cranks 84 and the levers 90 constitute means for transmitting motion to two tool supporting feed carriages 95 one of which is shown in FIG. 1. Each feed carriage 95 comprises a toothed rack 92 whose teeth mesh with the teeth of the respective segment 91 and which is constantly biased by a helical resilient element 96 in a direction toward and into abutment with an adjustable stop screw 98 carried by the machine frame 10. Each resilient element 96 operates between a lug 92a of the respective toothed rack 92 and a shoulder 10e of the machine frame. Each feed carriage 95 supports a tool 46a and is mounted in the machine frame in such a way as to guide the tool 46a toward and away from the respective work 50a carried by one of two work holding spindles 49a.

At the start of a working cycle, certain movable parts of the improved arrangement are assumed to be in their phantom-line positions shown in FIG. 1. If the drive shaft 15 is set in rotary motion to angularly displace the cylindrical cams 16 and 73, the latter causes the toothed rack 72 to move in the direction indicated by the arrow d. During such movement of the rack 72, the follower 12 of control carriage 11 is in the straight zone of the cam groove 16a and, therefore, does not move the control carriage from its position shown in FIG. 1. The movement of the toothed rack 72 in the direction of the arrow d causes the segment 76 to pivot the arms 79 in anticlockwise direction whereby the followers 71 move the arms 65 and the cam holders 66 into their full-line positions of FIG. 1. The cams 67 are thereby moved toward and engage with to be tracked by the respective followers 83 whereby the latter, through the bell cranks 84 and levers 90, cause the toothed racks 92 of the feed carriages 95 to advance in the direction of arrow e. Such movement of the racks 92 against the action of resilient elements 96 is rather fast, its exact stroke depending upon the angular position of levers 90 with respect to the bell cranks 84. If the angle enclosed by a lever 90 and the second arm 85 of the respective bell crank 84 is increased, the duration of engagement of cams 67 with the followers 83 also increases, and this results in a greater stroke of racks 92 and feed carriages 95. On the other hand, the stroke of rapid approach of racks 92 to move the tools toward the work is reduced if the angular position of bell cranks 84 with respect to the associated levers 90 is such that the followers 83 are moved further away from the start of cam 67 and thus the duration of engagement is decreased.

When the rapid advance of tools 46a toward the work 50a is completed under the influence of the toothed rack 72 and cam 73, the control carriage 11 causes the racks 92 to begin a second, slower, movement in order to bring the tools into and to thereupon maintain the tools in engagement with the respective work pieces 50a. FIG. 1 shows the control carriage 11 in its initial position of adjustment. When the inclined zone of the groove 16a comes into contact with the follower roller 12, the control carriage 11 is caused to move in the direction indicated by the arrow f to assume a second position of adjustment, whereby the simultaneously advancing cam surfaces 67a cause the followers 83 to travel therealong and to thereby again move the respective toother racks 92 in the direction of the arrow e with the difference, however, that the movement of feed carriages 95 is now slower and corresponds to the desired stroke through which the tools 46a should penetrate into the respective work pieces 50a. The exact stroke of such movements depends upon the momentary inclination of cam surfaces 67a and may be varied by changing the inclination of cam holders 66. When the control carriage 11 moves into the direction indicated by the arrow f, the follower 74 is in a straight zone of the cam groove 73a and, therefore, the cam 67 remains in its lifted position. In other words, the cam 67 is not rocked when the control carriage 11 moves to its second position of adjustment.

The arrangement of FIGS. 1 and 2 is particularly suitable for use in automatic machine tools with two or more work-supporting spindles, i.e. in so-called multiple-spindle machines. In such apparatus, all feed carriages are moved simultaneously, each in its own ways which need not be parallel with each other. The advantage of the arrangement shown in FIGS. 1 and 2 is that a single drive and a single control carriage is necessary for all feed carriages. If the arrangement operates with three or more feed carriages and with a corresponding number of work-supporting spindles, the length of the shafts 61 and 80 is increased so that these shafts may accommodate a greater number of arms 65 and bell cranks 84, respectively. Again, all such bell cranks and cam-supporting arms may be actuated by a single cylindrical cam 73 through a single toothed rack 72 and a single segment 76, i.e. through a single swinging or rocking assembly 70 with an increased number of follower rollers 71. However, by changing the angular position of cams 67 on the individual arms 65, and by also changing the angular position of individual bell cranks 84 with respect to the cooperating levers 90, each feed carriage 95 may be advanced through a different stroke not only for its quick approach but also during actual contact of the tool with the work.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An arrangement for advancing at least one tool at a plurality of different speeds, comprising a frame including means defining a linear path; a control carriage mounted in said frame and reciprocable along said path; drive means operatively connected with and adapted to move said carriage in said path between a first and a second position of adjustment; at least one linear cam; means for pivotally mounting said cam on said carriage so that the cam is rockable between a first and a second position of inclination; means mounted in said frame for rocking said cam with respect to said carriage so that the cam is rocked from said first position of inclination into said second position of inclination when the carriage is in said first position of adjustment; means for operatively connecting said rocking means with said drive means; tool supporting means mounted in and movable with respect to said frame; and motion transmitting means mounted in and movable with respect to said frame, said motion transmitting means operatively connected with said tool supporting means and comprising follower means for tracking said cam so as to move the tool supporting means at a first speed when said cam is rocked from said first position of inclination to said second position of inclination and to thereupon move said tool supporting means at a second speed when the cam reaches said second position of inclination and the carriage moves from said first position of adjustment toward said second position of adjustment.

2. An arrangement as set forth in claim 1, wherein said tool supporting means comprises a rack and said motion transmitting means comprises a pair of levers turnable about a common axis, said levers adjustable with respect to each other about said common axis and said follower means secured to one of said levers, the other of said levers comprising a gear sector meshing with said rack.

3. An arrangement as set forth in claim 1, further comprising means for adjusting the position of said cam with respect to said carriage.

4. An arrangement as set forth in claim 1, wherein said rocking means comprises a rack reciprocably mounted in said frame, a gear sector meshing with said rack and pivotally mounted in said frame, and roller means operatively connected with said gear sector for rocking said cam.

5. An arrangement as set forth in claim 1, wherein the means for pivotally mounting said cam on said carriage comprises a lever.

6. An arrangement as set forth in claim 5, further comprising means for adjusting the position of said cam with respect to said lever.

7. An arrangement for advancing at least one tool at a plurality of different speeds, comprising a frame including means defining a linear path; a control carriage mounted in said frame and reciprocable along said path; drive means operatively connected with and adapted to move said carriage in said path between a first and a second position of adjustment; a plurality of linear cams; means for pivotally mounting said cams on said carriage so that each cam is rockable between a first and a second position of inclination; means mounted in said frame for rocking said cams with respect to said carriage so that each cam is rocked from said first position of inclination into said second position of inclination when the carriage is in said first position of adjustment; means for operatively connecting said rocking means with said drive means; tool supporting means mounted in and movable with respect to said frame; and motion transmitting means mounted in and movable with respect to said frame, said motion transmitting means operatively connected with said tool supporting means and comprising follower means for tracking said cams so as to move the tool supporting means at a first speed when said cams are rocked from said first position of inclination to said second position of inclination and to thereupon move said tool supporting means at a second speed when the cams reach said second position of inclination and the carriage moves from said first position of adjustment toward said second position of adjustment.

References Cited in the file of this patent

UNITED STATES PATENTS

| | | |
|---|---|---|
| 667,350 | Ulrich et al. | Feb. 5, 1901 |
| 880,916 | Potter | Mar. 3, 1908 |
| 1,484,604 | Chapman | Feb. 19, 1924 |
| 1,604,204 | Tessky | Oct. 26, 1926 |
| 1,666,187 | Van Hammersveld | Apr. 17, 1928 |
| 2,145,305 | Hull | Jan. 31, 1939 |
| 2,430,252 | Simmon et al. | Nov. 4, 1947 |
| 2,617,307 | Drissner | Nov. 11, 1952 |
| 2,692,509 | Gibson | Oct. 26, 1954 |
| 2,728,255 | Becker | Dec. 27, 1955 |
| 2,884,791 | Enstrom | May 5, 1959 |
| 2,912,989 | Borodin | Nov. 17, 1959 |